United States Patent [19]

Dennis

[11] 4,446,809
[45] May 8, 1984

[54] ADJUSTABLE LENS FOR A TRANSMISSION RATIO INDICATOR

[75] Inventor: Robert P. Dennis, Bloomfield Hills, Mich.

[73] Assignee: General Motors Corporation, Detroit, Mich.

[21] Appl. No.: 345,066

[22] Filed: Feb. 2, 1982

[51] Int. Cl.³ .............................................. G09F 9/00
[52] U.S. Cl. ........................ 116/28.1; 116/DIG. 20; 116/334; 116/306
[58] Field of Search .............. 116/28.1, DIG. 20, 312, 116/314, 292, 315, 313, 334, 306

[56] References Cited

U.S. PATENT DOCUMENTS

| | | | |
|---|---|---|---|
| 2,549,096 | 4/1951 | Jacobi | 116/DIG. 20 |
| 2,861,538 | 11/1958 | Evans | 116/315 |
| 3,310,025 | 3/1967 | Egner | 116/312 |
| 3,459,262 | 8/1969 | Powell | 116/312 |
| 3,985,095 | 10/1976 | Nurse | 116/28.1 |

Primary Examiner—Charles Frankfort
Assistant Examiner—Denis E. Corr
Attorney, Agent, or Firm—Donald F. Scherer

[57] ABSTRACT

A transmission ratio indicator has a lens assembly with a ratio selection indicia imprinted thereon. The transmission selector lever or an indicator associated therewith is selectively movable to various ratios and is aligned with the indicia to indicate the transmission operating condition. The lens assembly is secured in a housing by a resilient member and interengaging toothed portions formed on the lens assembly and housing. The lens assembly toothed portion can be disengaged from the housing toothed portion by displacement of the resilient member through application of a force to the lens assembly. When tooth disengagement has been attained, the lens assembly can be moved in the housing to attain proper alignment of the indicia and the shift lever or indicator. The adjusted position of the lens assembly is maintained by the resilient member enforcing the reengagement of the toothed portions.

2 Claims, 8 Drawing Figures

ADJUSTABLE LENS FOR A TRANSMISSION RATIO INDICATOR

This invention relates to transmission ratio indicator mechanisms and more particularly to such mechanisms having an adjustable indicia-carrying lens member.

It is an object of this invention to provide an improved transmission ratio indicator mechanism wherein a lens assembly having indicia thereon is adjustable within a housing to provide alignment between the transmission ratio indicator and the indicia.

It is another object of this invention to provide an improved transmission ratio indicator and lens structure wherein a transmission shift lever housing has a toothed portion which is engaged by a toothed portion on the lens structure and wherein the engagement is releasably maintained by a spring member so that the teeth can be selectively disengaged and the lens structure can be moved relative to the transmission shift lever housing after assembly in a vehicle to provide alignment with the transmission ratio indicator.

It is a further object of this invention to provide an improved transmission shift indicator mechanism wherein a lens structure has a lens housing and an indicia carrying lens plate with the lens housing having teeth disposed thereon in mating relationship with teeth on the transmission shift lever housing and wherein a pair of spring members disposed between the two housings urge the teeth into releasable engagement whereby movement of the lens housing relative to the transmission shift lever housing is permitted to establish alignment of the indicia with a transmission ratio indicator.

These and other objects and advantages of the present invention will be more apparent from the following description and drawings in which.

Figure 1:
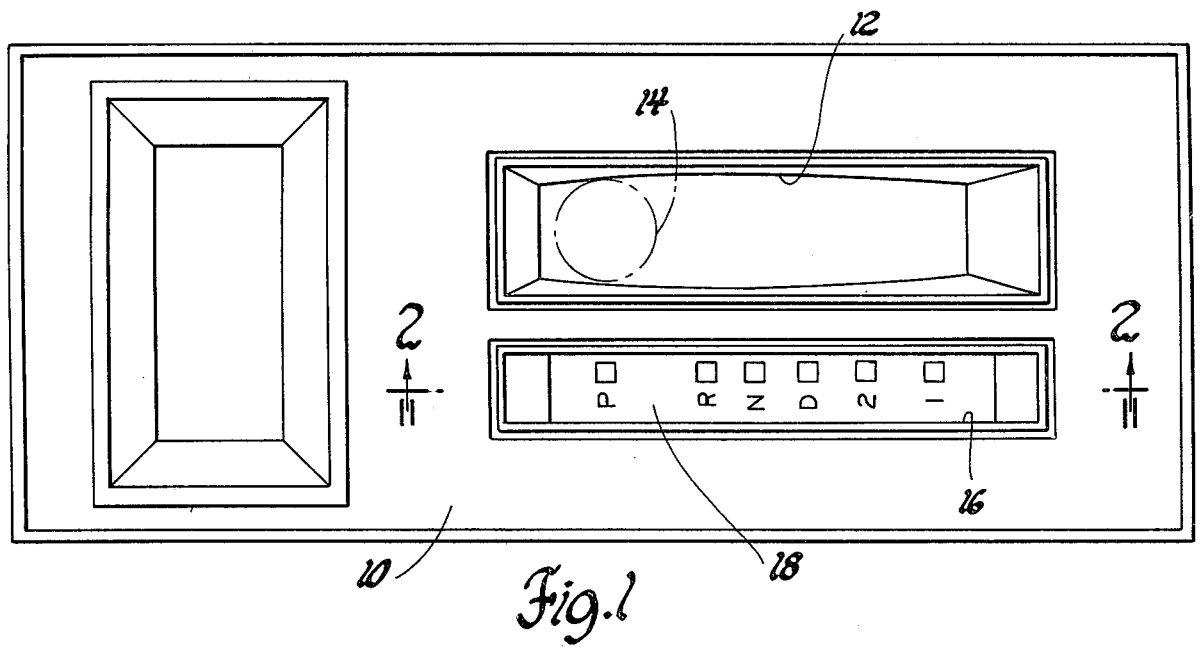
FIG. 1 is a top view of a transmission shift lever and indicator housing.

Referring to the drawings, wherein like characters represent the same or corresponding parts throughout the several views, there is seen in FIG. 1, a transmission shift lever and indicator housing 10 which is utilized to enclose a transmission shift lever mechanism such as, for example, that shown in U.S. Pat. No. 3,998,109 issued to O'Brien Dec. 21, 1976, or U.S. Pat. No. 3,985,095 issued to Nurse Oct. 12, 1976. In the alternative, similar well-known transmission shift lever and indicator structures can be utilized.

The housing 10 has formed therein an opening 12 in which is disposed the transmission shift lever shown in phantom at 14. The housing 10 also has an opening 16 in which is disposed a lens 18 having indicia imprinted thereon. The indicia indicates the transmission mode selected by the operator. The transmission selection is made by the operator through the movement of transmission shift lever 14. The operating modes which can be selected are well-known and are indicated by letters and numerals on the lens 18 such as P (Park), R (Reverse), N (Neutral), D (Drive), 2 (Intermediate) and 1 (Low).

In operation, the indication of transmission ratio selection can be indicated by the shift lever 14 aligning with the indicia or by having a separate indicator mechanism to align with the indicia.

Figure 2:
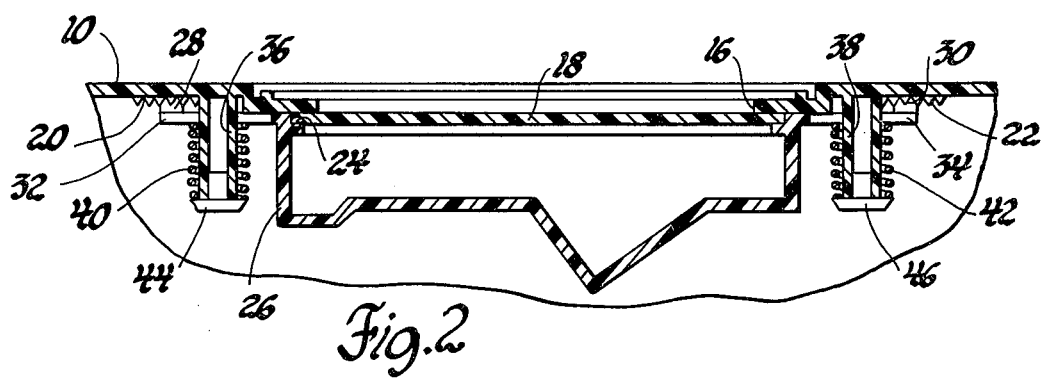
FIG. 2 is a sectional view taken along line 2—2 of FIG. 1.
Figure 3:
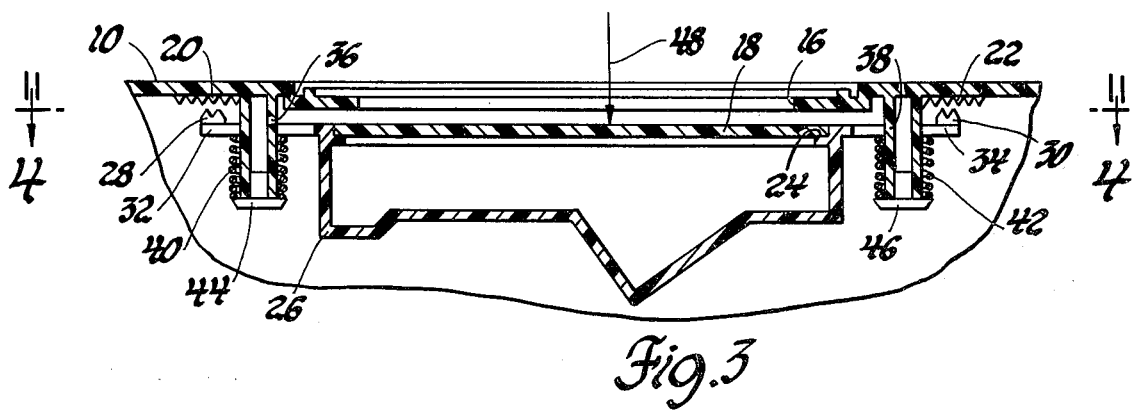
FIG. 3 is a view similar to FIG. 2 showing an alternate operating condition.
Figure 4:
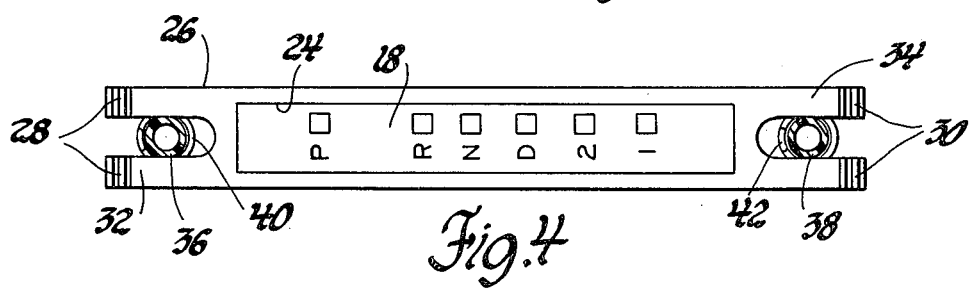
FIG. 4 is a sectional view taken along line 4—4 of FIG. 3.

In FIGS. 2, 3 and 4, the preferred embodiment of the present invention is shown and includes a pair of toothed portions 20 and 22 formed on the housing 10. The lens 18 is disposed in a recess 24 formed in a lens housing 26. The lens housing 26 has a pair of toothed portions 28 and 30 which are selectively engageable with toothed portions 20 and 22. As seen in FIG. 4, the toothed portion 28 is formed on a bifurcated arm 32 and the toothed portion 30 is formed on a bifurcated arm 34. The arms 32 and 34 straddle posts 36 and 38, respectively, which posts are formed integral with the housing 10. A pair of springs 40 and 42 surround the respective posts 36 and 38 and are maintained by respective plug members 44 and 46 which are secured to the respective posts 36 and 38. The springs 40 and 42 urge the lens housing 26 upward as viewed in FIGS. 2 and 3 so as to maintain engagement between the toothed portions 20 and 28 and 22 and 30.

When these toothed portions are engaged, the lens housing 26 and therefore lens 18 is secured in position relative to the housing 10. By application of a force in the direction of Arrow 48, as shown in FIG. 3, the lens housing 26 can be moved downward against the springs 40 and 42 permitting disengagement of the toothed portions. When the toothed portions are disengaged, the lens housing 26, and therefore lens 18, can be moved relative to the housing 10 so that alignment of the indicia and the shift lever or indicator mechanism can be attained at assembly. After alignment is attained, the force is removed and the teeth will reengage because of springs 40 and 42 such that unintentional movement will not occur.

Figure 5:
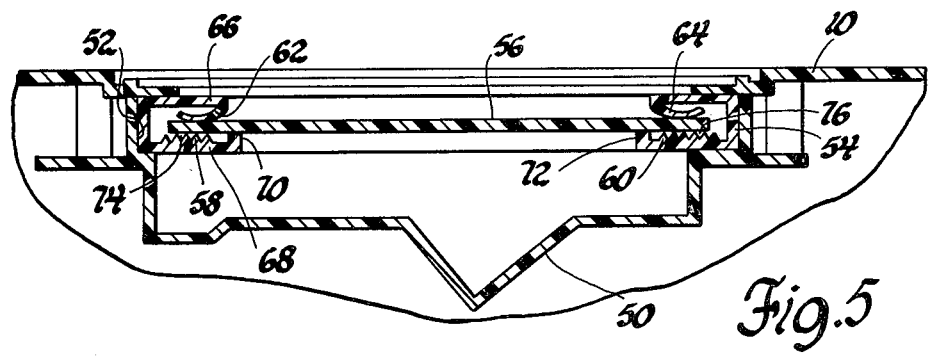
FIG. 5 is a view similar to FIG. 2 showing another embodiment of the invention.
Figure 6:
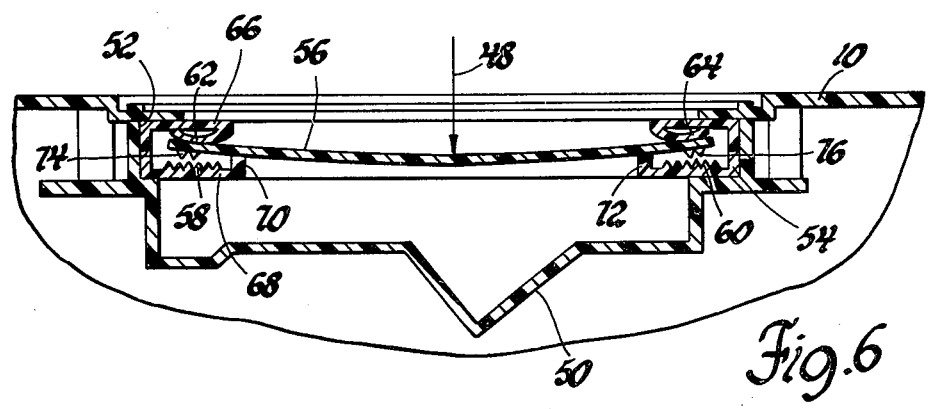
FIG. 6 is a view similar to FIG. 3 showing the alternate operating condition of the embodiment of FIG. 5.

The embodiment shown in FIGS. 5 and 6 includes a housing 10 in which is disposed a lens housing 50. The lens housing 50 has an opening or recess 52 in which is disposed a lens support housing 54 which has positioned therein a lens 56. The lens support housing 54 has a pair of spaced toothed portions 58 and 60, and a pair of resilient spring fingers 62 and 64. The spring fingers 62 and 64 are integral with a wall portion 66 while the toothed portions 58 and 60 are integral with a wall portion 68 which is secured to wall portion 66 after positioning of the lens 56. As shown, the wall 68 has a pair of support flanges 70 and 72 formed therein.

The lens 56 has a pair of toothed portions 74 and 76 adapted to mate with toothed portions 58 and 60, respectively. The toothed portions are urged into engagement by the spring fingers 62 and 64 as shown in FIG. 5. Application of a force in the direction of Arrow 48, as shown in FIG. 6, will result in bending or deflection of the lens 56 due to the abutment on support flanges 70 and 72. The bending of lens 56 will result in disengagement of the toothed portions such that movement of the lens 56 relative to housing 10 is permitted whereby desired alignment of the indicia is obtained. Removal of the force permits the lens to assume the position shown in FIG. 5 wherein toothed engagement reoccurs and the lens is secured relative to the housing 10 such that undesired movement will not occur.

Figure 7:
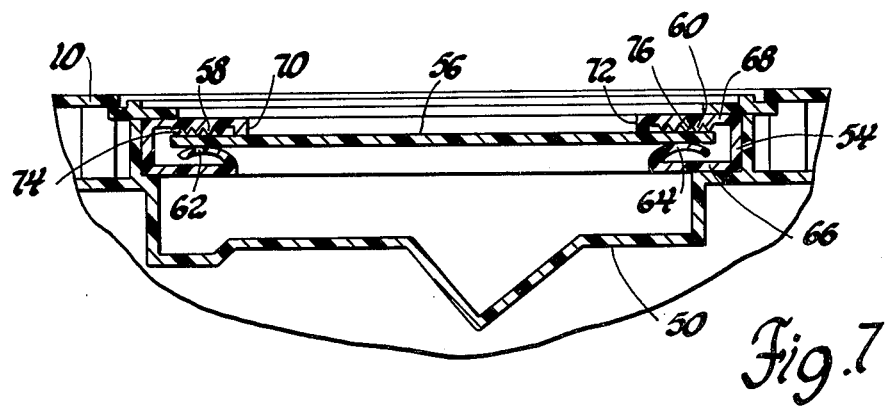
FIG. 7 is a view similar to FIG. 2 showing a further embodiment of the invention.
Figure 8:
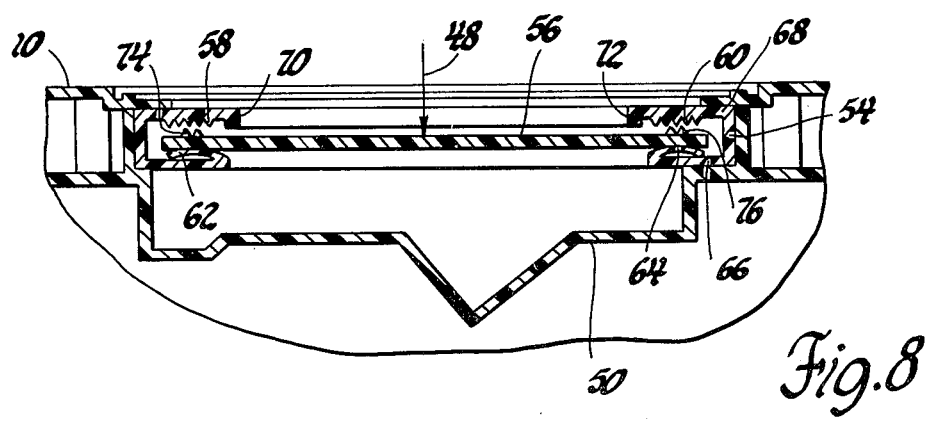
FIG. 8 is a view showing the alternate operating position of the embodiment shown in FIG. 7.

The embodiment shown in FIGS. 7 and 8 is very similar to that shown in FIGS. 5 and 6. However, the support housing 54 is mounted so that the wall 68 is disposed adjacent the housing 10 and the wall 66 is disposed against the lens housing 50.

As seen in FIG. 8, application of a force in the direction of Arrow 48 will result in the lens 56 moving downward against spring fingers 62 and 64 away from support flanges 70 and 72. Without the support flanges to cause bending of the lens 56, it will remain substantially flat during downward deflection. The downward deflection of lens 56 will cause disengagement of the mating toothed portions 58 and 74 and 76 and 60. In this condition or operating position, the lens 56 can be adjusted relative to the shift lever or shift indicator mechanism to permit the desired alignment of the indicia. Release of the force will permit the spring fingers 62 and 64 to retain the lens 56 to the position shown in FIG. 7 in which toothed engagement is obtained and unintentional movement of the lens 56 will not occur.

The present invention permits the adjustment of the indicia carrying lens relative to the indicator mechanism after final assembly and without the use of tools, such as a wrench or screwdriver. Mechanisms utilizing threaded fasteners for securing the indicia carrying lens are known, however, these systems generally require the use of a cover member for the fasteners or require the removal of the shift lever housing so that lens adjustment can be obtained. The present invention permits a rapid and easy method for obtaining the desired alignment.

The simplicity of the system shown in FIGS. 5 and 7 should be especially appreciated since the lens support housing and lens member can be preassembled prior to being placed in position in the housing 10. The use of the integral spring fastener in these embodiments provide the advantage of reduced handling of small parts. However, the embodiments shown in FIG. 2 permits the use of separate spring members, which can provide a more closely controlled spring force in the system, and a more rigid lens structure.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in automatic transmission ratio indicating mechanisms having a position indicator movable in a transmission lever housing, and a lens structure attached to said housing with indicia disposed thereon which cooperate with said position indicator to indicate the transmission ratio selected, wherein the improvement comprises; a lens housing disposed in said transmission lever housing including a wall portion having two resilient finger members formed integral thereon, another wall portion having a pair of support flanges and two groups of housing teeth formed integral thereon, a lens member with the indicia thereon disposed between the wall portions and being urged toward the toothed wall portion by said resilient finger members, and two groups of lens teeth disposed on said lens member and cooperating with the respective wall portion teeth to position said lens member in said lens structure, said resilient finger members being operable to urge engagement between respective groups of teeth and said lens member being deflectable against said resilient member upon application of a force thereto for disengaging said respective groups of teeth to permit movement of said lens member in said lens housing relative to said position indicator to establish alignment of said position indicator and said indicia.

2. An improvement in automatic transmission ratio indicating mechanisms having a position indicator movable in a transmission lever housing, and a lens structure attached to said housing with indicia disposed thereon which cooperate with said position indicator to indicate the transmission ratio selected, wherein the improvement comprises; a lens housing disposed in said transmission lever housing including a wall portion having two resilient finger members formed integral thereon, another wall portion having a pair of support flanges and two groups of housing teeth formed integral thereon, a lens member with the indicia thereon disposed between the wall portions and being urged toward the toothed wall portion by said resilient finger members, and two groups of lens teeth disposed on said lens member and cooperating with the respective wall portion teeth to position said lens member in said lens structure, said resilient finger members being operable to urge engagement between respective groups of teeth and said lens member being deflectable against said resilient member upon application of a force thereto resulting in bending of the lens member due to said support flanges thereby causing disengagement of said respective groups of teeth to permit movement of said lens member in said lens housing relative to said position indicator to establish alignment of said position indicator and said indicia.

* * * * *